US011868431B2

(12) United States Patent
Kakimoto et al.

(10) Patent No.: US 11,868,431 B2
(45) Date of Patent: Jan. 9, 2024

(54) INFORMATION PROCESSING APPARATUS, INFORMATION PROCESSING METHOD, AND NON-TRANSITORY COMPUTER READABLE MEDIUM

(71) Applicant: KABUSHIKI KAISHA TOSHIBA, Tokyo (JP)

(72) Inventors: Mitsuru Kakimoto, Kawasaki Kanagawa (JP); Hiromasa Shin, Yokohama Kanagawa (JP); Yoshiaki Shiga, Kawasaki Kanagawa (JP); Fang Ni, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 17/197,377

(22) Filed: Mar. 10, 2021

(65) Prior Publication Data

US 2022/0076060 A1    Mar. 10, 2022

(30) Foreign Application Priority Data

Sep. 7, 2020 (JP) ................................. 2020-150029

(51) Int. Cl.
*G06F 11/30* (2006.01)
*G06F 18/2132* (2023.01)
(Continued)

(52) U.S. Cl.
CPC .......... *G06F 18/2132* (2023.01); *G01W 1/10* (2013.01); *G05B 13/042* (2013.01); *G05B 13/048* (2013.01)

(58) Field of Classification Search
CPC .................... G06K 9/6234; G06F 18/2132
See application file for complete search history.

(56) References Cited

U.S. PATENT DOCUMENTS

2016/0078112 A1* 3/2016 Eickelman ............ G06F 16/254
707/602
2017/0075035 A1* 3/2017 Kakimoto ............... G01W 1/10

FOREIGN PATENT DOCUMENTS

JP    2009-211693 A   *  9/2009
JP    2009-211693 A       9/2009
(Continued)

OTHER PUBLICATIONS

Monache et al., "Probabilistic Weather Prediction with an Analog Ensemble", Am. Meterologicial Soc., Monthly Weather Review, vol. 141, No. 10, pp. 3498-3516 (2013) (hereinafter "Monache"). (Year: 2013).*

(Continued)

*Primary Examiner* — Phuong Huynh
(74) *Attorney, Agent, or Firm* — Finnegan, Henderson, Farabow, Garrett & Dunner, LLP

(57) ABSTRACT

According to one embodiment, an information processing apparatus includes: a processor configured to select a first case based on subject data including at least one feature, and acquire a first prediction value that is a value of an objective variable included in the first case; a first estimator configured to estimate frequency data indicating frequencies of observation values of the objective variable, based on a history of observation values of the objective variable; a second estimator configured to estimate first frequency data indicating frequencies of first prediction values, based on a history of first prediction values acquired before the first prediction value is acquired; and a corrector configured to correct the first prediction value acquired by the processor, based on the frequency data and the first frequency data.

16 Claims, 17 Drawing Sheets

(51) Int. Cl.
*G05B 13/04* (2006.01)
*G01W 1/10* (2006.01)

(56) References Cited

FOREIGN PATENT DOCUMENTS

| | | |
|---|---|---|
| JP | 5115493 B2 | 1/2013 |
| JP | 2015-210222 A | 11/2015 |
| JP | 2016-45799 A | 4/2016 |
| JP | 2017-53804 A | 3/2017 |
| JP | 2018-105893 A | 7/2018 |

OTHER PUBLICATIONS

B. Efron et al., "Chapter 4: The empirical distribution function and the plug-in principle," in An Introduction to the Bootstrap, Chapman & Hall/CRC, pp. 31-38 (1993).
H. Hersbach, "Decomposition of the Continuous Ranked Probability Score for Ensemble Prediction Systems," Am. Meteorological Soc., Weather and Forecasting, vol. 15, No. 5, pp. 559-570 (2000).
L.D. Monache et al., "Probabilistic Weather Prediction with an Analog Ensemble," Am. Meteorological Soc., Monthly Weather Review, vol. 141, No. 10, pp. 3498-3516 (2013).

\* cited by examiner

| TIME | FEATURE 1 | ... | FEATURE N | OBJECTIVE VARIABLE |
|---|---|---|---|---|
| ... | ... | ... | ... | ... |
| ... | ... | ... | ... | ... |
| ... | ... | ... | ... | ... |

FIG. 2

| TIME | NUMERICALLY CALCULATED FEATURE 1 | ... | NUMERICALLY CALCULATED FEATURE N | OBJECTIVE VARIABLE |
|---|---|---|---|---|
| ... | ... | ... | ... | ... |
| ... | ... | ... | ... | ... |
| ... | ... | ... | ... | ... |

FIG. 16

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2020-150029, filed on Sep. 7, 2020, the entire contents of which are incorporated herein by reference.

FIELD

Embodiments described herein relate to an information processing apparatus, an information processing method, and a computer program.

BACKGROUND

When numerical prediction of a variable (which will be referred to as an objective variable) is performed, in general, a model for prediction is created. As one of methods for creating such a model, prediction is performed based on search for past similar examples in some cases. For example, using a given current state, a plurality of similar cases (similar examples) are selected from a database in which past cases are stored. Each case includes a state and a value of the objective variable, and a plurality of similar examples are selected that rank highly in terms of closeness of distance to the current state. A distribution of the values of the objective variable included in the selected similar examples is outputted as probabilistic predictions. However, when distances between the selected similar examples and the current state are large, the outputted distribution significantly deviates from an intended distribution of prediction values, and prediction performance is reduced.

BRIEF DESCRIPTION OF THE DRAWINGS

FIG. 2 shows an example of a past state DB;

FIG. 16 shows an example of a past numerically calculated feature DB; and

DETAILED DESCRIPTION

According to one embodiment, an information processing apparatus includes: a processor configured to select a first case based on subject data including at least one feature, and acquire a first prediction value that is a value of an objective variable included in the first case; a first estimator configured to estimate frequency data indicating frequencies of observation values of the objective variable, based on a history of observation values of the objective variable; a second estimator configured to estimate first frequency data indicating frequencies of first prediction values, based on a history of first prediction values acquired before the first prediction value is acquired; and a corrector configured to correct the first prediction value acquired by the processor, based on the frequency data and the first frequency data.

Hereinafter, embodiments of the present invention will be described with reference to drawings. In the following, a description will be given by taking weather prediction, particularly prediction of solar irradiance at a certain point A, as an example. However, the embodiments can be applied to various prediction, and is not limited to weather prediction. Prediction may be prediction of anything, such as prediction of demand for electric power, prediction of share prices on a stock market, prediction of prices of electricity on an electricity transaction market, or prediction of a meteorological variable other than the solar irradiance.

First Embodiment

Figure 1:
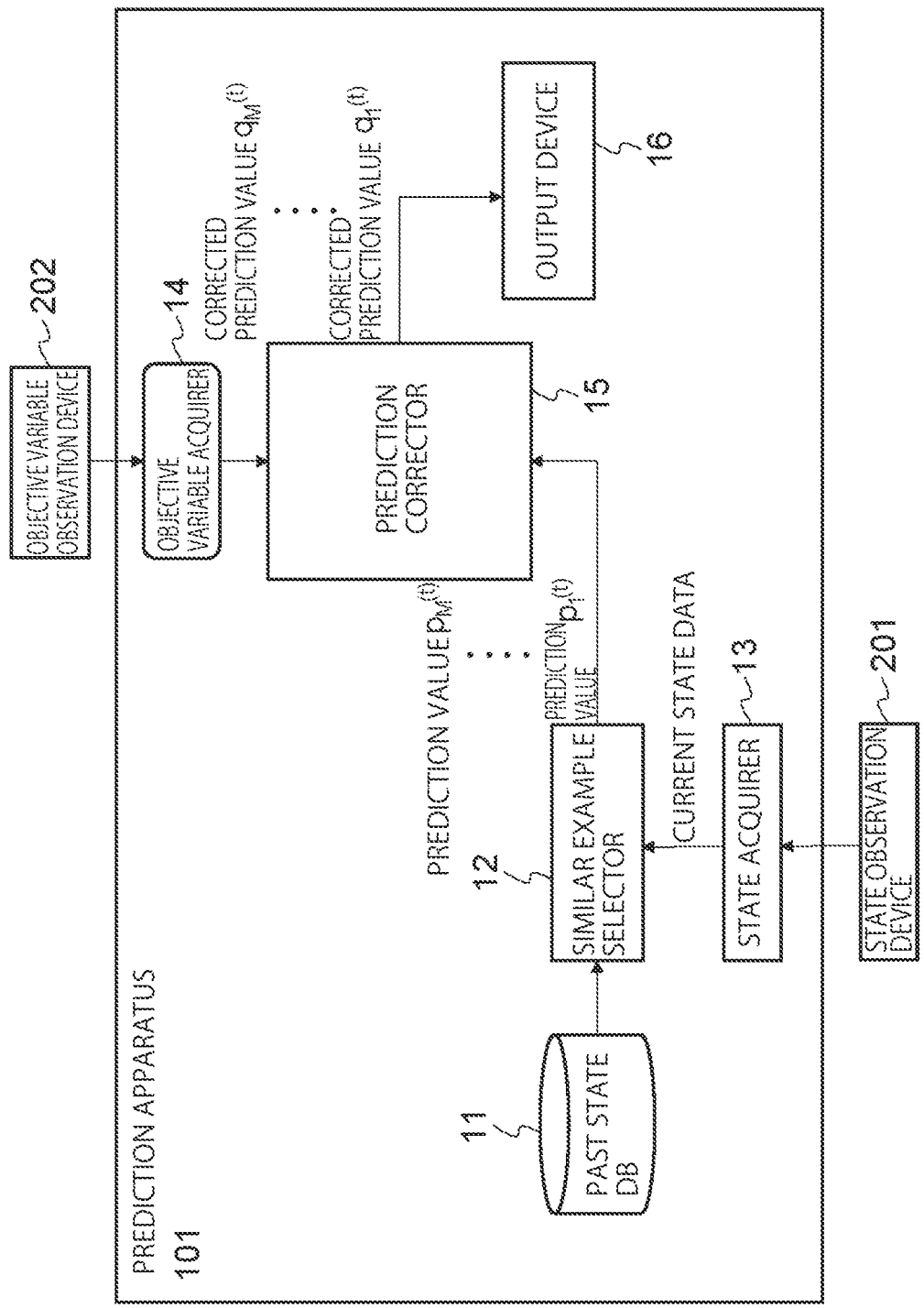
FIG. 1 is a block diagram of a prediction apparatus that is an information processing apparatus according to a first embodiment.

FIG. 1 is a block diagram of a prediction apparatus 101 that is an information processing apparatus according to a first embodiment. The prediction apparatus 101 in FIG. 1 includes a past state database (DB) 11, a similar example selector (processor) 12, a state acquirer 13, an objective variable acquirer 14, a prediction corrector 15, and an output device 16. The state acquirer 13 is communicably connected to a state observation device 201. The objective variable acquirer 14 is communicably connected to an objective variable observation device 202.

[Past State DB 11]

The past state DB 11 stores a plurality of cases, each of which includes state data (first data) on a subject system and a value of an objective variable, each in association with a time. A set of state data, a value of the objective variable, and a time corresponds to one case. The value of the objective variable is a past observation value corresponding to a state indicated by the state data, and is used for a future prediction value corresponding to the state.

The state data (first data) on the subject system includes one or more features that characterize a state of the subject system. For example, the state data includes meteorological variables such as a temperature, a humidity, and a wind speed at the point A at a certain time, as a past weather state (past features). To be more general, the state data may include other meteorological variables and the like.

The objective variable is a feature related to a past weather state, and is a feature to be predicted in the present embodiment. In the present embodiment, the objective variable is assumed to be solar irradiance at the point A on a next day, that is, 24 hours later. Assuming that a time of state data corresponding to a value of the objective variable is "t", the value of the objective variable corresponding to the state data (the value of the objective variable included in the same case that includes the state data) is not solar irradiance at the point A at the time "t", but solar irradiance at the point A 24 hours after "t".

Although the features are meteorological variables at the point A in the present example, features at points around the point A can also be added, on a supposition that the meteorological variables at such nearby points also affect the solar irradiance. Similarly, the meteorological variables before the time of prediction (before the time "t") can also be added as features.

FIG. 2 shows an example of the past state DB 11. In the past state DB 11, a plurality of past several years of cases, each of which is a set of state data (one or more features) and a value of the objective variable as described above, are stored for each time.

[State Acquirer 13]

The state acquirer 13 acquires, from the state observation device 201, state data including one or more features of the same types as the features in the past state DB 11. As an example, the state acquirer 13 acquires state data including a temperature, a humidity, an atmospheric pressure, a wind speed, and the like at each fixed interval. For example, the state observation device 201 is installed at the point A, and observes a temperature, a humidity, an atmospheric pressure, a wind speed, and the like at the point A. The state acquirer 13 stores the acquired state data as a history in an internal storage. The state acquirer 13 provides, to the similar example selector 12, current state data (subject data) that is state data at a time the similar example selector 12 uses the state data for prediction. The current state data (subject data) may be provided in response to a request from the similar example selector 12. The current state data includes one or more features at the current time, that is, the time at which prediction is intended to be performed. The current state data is a feature or features of the same types as the features stored in the past state DB 11. In the above-described example, the current state data includes a temperature, a humidity, an atmospheric pressure, a wind speed, and the like at the current time at the point A.

[Similar Example Selector 12]

The similar example selector 12 (processor) determines that prediction of the objective variable is performed at each predetermined time, and receives current state data to be used for prediction from the state acquirer 13.

The similar example selector 12 calculates a degree of similarity between the state data (one or more features) stored in the past state DB 11 and the current state data, in a feature space that is a space with each feature serving as a coordinate of a coordinate system. The degree of similarity is calculated based on a predetermined distance (metric) that indicates a degree of closeness in the feature space. Typically, the degree of similarity is measured as a Euclidean distance in the feature space. In such a case, a shorter distance indicates more similarity.

Assuming that the Euclidean distance between sets of the features "X"=$(x_1, \ldots, x_N)$ and "Y"=$(y_1, \ldots, y_N)$ is "d", the Euclidean distance is calculated as follows:

[Expression 1]

$$d = \sqrt{\sum_{i=1}^{N}(x_i - y_i)^2} \quad (1)$$

Since the features include features of different dimensions and features of different scales, such as temperature, wind speed, and atmospheric pressure, it is preferable that appropriate standardization be made beforehand.

The similar example selector 12 selects a predetermined number (M) of cases in descending order of degree of similarity (ascending order of distance, or ascending order of value as the degree of similarity). The selected cases are referred to as similar examples or similar cases.

Figure 3:
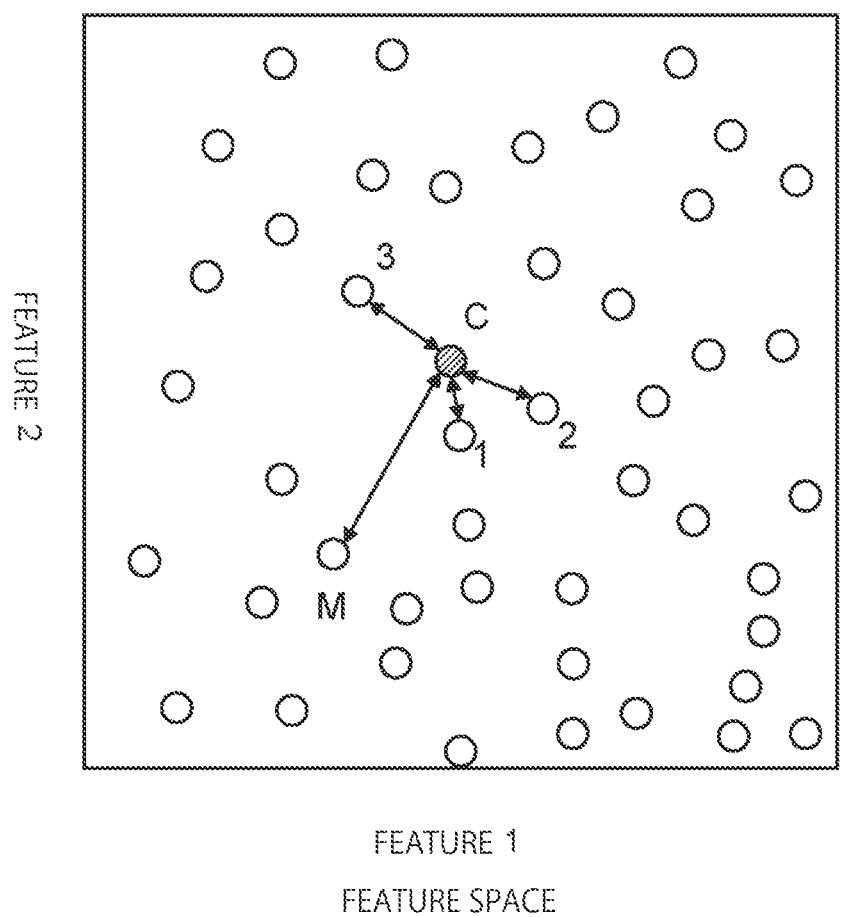
FIG. 3 shows an example of selection of similar examples in a feature space.

FIG. 3 shows an example of selection of similar examples in a feature space in which a plurality of the features are assumed to be a feature 1 and a feature 2. A point C in the center corresponds to current state data, and points 1, 2, 3, . . . , M correspond to similar examples.

A whole of the selected similar examples is referred to as an ensemble, and "M" is referred to as a size of the ensemble. Each case in the ensemble is referred to as a member. The members have member rankings that indicate what place a member ranks in descending order of degree of similarity. In the example in FIG. 3, since the points 1, 2, 3, . . . , M, in this order, are closer to the current state data, the cases 1 to M, in this order, have higher rankings.

The similar example selector 12 acquires respective values of the objective variable in the selected similar examples, as prediction values of the objective variable corresponding to the current state data. A set of the prediction values is referred to as ensemble prediction data. Each prediction value in the ensemble prediction data is also referred to as an ensemble member. Each member value is a prediction value of the objective variable. Dispersion of such values can be regarded as uncertainty of the prediction, and the ensemble prediction data that is a whole of the prediction values can be regarded as probabilistic predictions. In other words, the ensemble prediction data is probabilistic predictions based on a set of a plurality of the prediction values.

Hereinafter, a prediction value of a member with a ranking "k" at a time "t" is denoted by "$p_k^{(t)}$". The ensemble prediction data can be denoted by $\{p_1^{(t)}, p_2^{(t)}, \ldots, p_M^{(t)}\}$.

As described above, the similar example selector 12 corresponds to a processor that selects a similar example from among a plurality of cases, based on current state data, and acquires a prediction value that is a value of the objective variable included in the selected similar example.

[Objective Variable Acquirer 14]

The objective variable acquirer 14 acquires, from the objective variable observation device 202, an observation value of the objective variable that is to be predicted, at each fixed time interval. In other words, the objective variable acquirer 14 collects observation values of the objective variable that is to be predicted, from the objective variable observation device 202. In the example of the present embodiment, the solar irradiance at the point A is the objective variable. The objective variable observation device 202 such as an instrument for measuring solar irradiance is installed at the point A, and the objective variable acquirer 14 collects values of the solar irradiance from the objective variable observation device 202. The objective variable acquirer 14 may store the collected observation values of the objective variable as a history in an internal storage. The objective variable acquirer 14 provides the collected observation values of the objective variable to the prediction corrector 15. The observation values of the objective variable may be provided in response to a request from the prediction corrector 15. The objective variable is an objective variable of the same type as a feature stored in past state DB 11.

The observation values of the objective variable collected by the objective variable acquirer 14 and the state data acquired by the state acquirer 13 may be accumulated in the past state DB 11. In such a case, the similar example selector 12 may acquire current state data from the past state DB 11, and the prediction corrector 15 may acquire an observation value of the objective variable from the past state DB 11.

[Prediction Corrector 15]

The prediction corrector 15 corrects the ensemble prediction data provided from the similar example selector 12. More specifically, the prediction corrector 15 corrects the individual prediction values "$p_1^{(t)}$", "$p_2^{(t)}$", . . . , "$p_M^{(t)}$" included in the ensemble prediction data, and provides corrected prediction values "$q_1^{(t)}$", "$q_2^{(t)}$", . . . , "$q_M^{(t)}$" to the output device 16.

Figure 4:
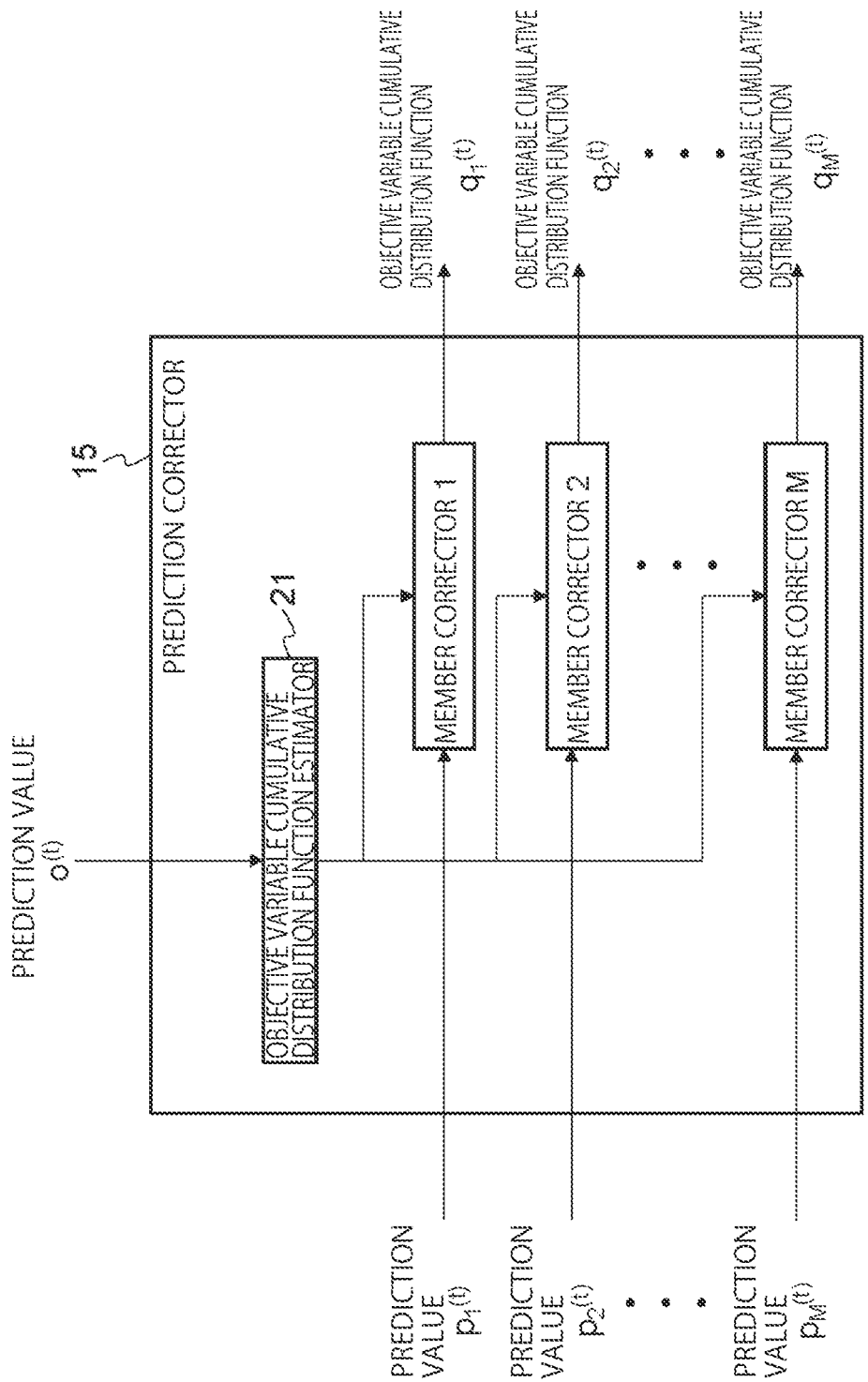
FIG. 4 is a block diagram of a prediction corrector.

FIG. 4 is a block diagram of the prediction corrector 15. The prediction corrector 15 includes an objective variable cumulative distribution function estimator 21 (first estimator) 21 and member correctors 1 to M.

[Objective Variable Cumulative Distribution Function Estimator 21]

The objective variable cumulative distribution function estimator 21 estimates data (frequency data) related to frequency of the observation values of the objective variable, based on the observation values of the objective variable provided from the objective variable acquirer 14. Specifically, a cumulative distribution function "$F^{(t)}$" for the observation values of the objective variable is estimated as the frequency data.

There are various methods for estimating a cumulative distribution function from data acquired with respect to a variable. In the present embodiment, a following method is used as an example. It is assumed that at present, there are N values "$x_1$", "$x_2$", . . . , "$x_N$" that are collected over a certain time period with respect to a variable "X". At the time, an estimation expression for a cumulative distribution function "P(X)" for "X" is given as follows:

[Expression 2]

$$P(X) = \frac{1}{N} \sum_{i=1}^{N} \theta(X - x_i) \quad (2)$$

where θ is a function referred to as Heaviside step function, and is defined by a following expression:

[Expression 3]

$$\theta(x) = \begin{cases} 1 & x \geq 0 \\ 0 & x < 0 \end{cases} \quad (3)$$

In the present embodiment, estimation of the cumulative distribution function is performed by using data (observation values of the objective variable) collected during a predetermined time period "L", that is, between "t−L" and "t−1" assuming that a current time is "t". In a case of weather prediction, a length of "L" is, as an example, approximately three months. Such a time period corresponds to a length of one season in Japan. Although a cumulative distribution function is estimated as the frequency data, a probability density distribution, a histogram, or the like may also be estimated.

[Member Correctors 1 to M]

Each member corrector k (k=1 to M) corrects the prediction value "$p_k^{(t)}$" of a member with the ranking k, based on the cumulative distribution function for the observation values of the objective variable, and calculates the corrected prediction value "$q_k^{(t)}$".

Figure 5:
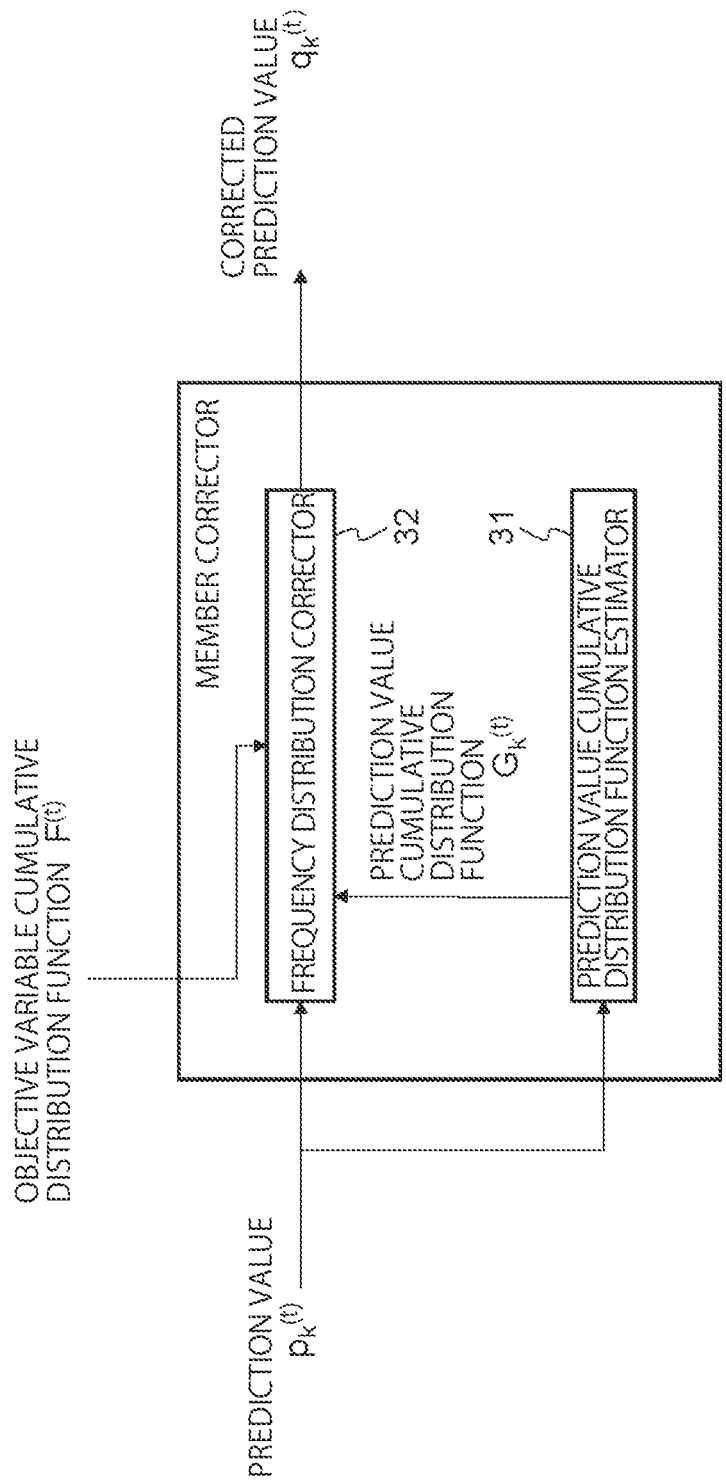
FIG. 5 is a block diagram of a member corrector.

FIG. 5 is a block diagram of a member corrector k. The member corrector k includes a prediction value cumulative distribution function estimator 31 (second estimator) and a frequency distribution corrector 32 (corrector).

[Prediction Value Cumulative Distribution Function Estimator 31]

The prediction value cumulative distribution function estimator 31 collects the prediction values "$p_k^{(t)}$" for an ordinal number "k" for a fixed time period, and generates frequency data on the prediction values for the ordinal number "k". Specifically, a cumulative distribution function for the prediction values for the ordinal number "k" is estimated as the frequency data. An estimation method and a data collection period are the same as in the case of the objective variable cumulative distribution function. Although a cumulative distribution function is estimated as the frequency data in the present example, a probability density distribution, a histogram, or the like may also be estimated.

[Frequency Distribution Corrector 32]

The frequency distribution corrector 32 calculates the corrected prediction value "$q_k^{(t)}$" for the ordinal number "k" from the prediction value "$p_k^{(t)}$" for the ordinal number "k", by using the objective variable cumulative distribution function "$F^{(t)}$" and the prediction value cumulative distribution function "$G_k^{(t)}$" for the ordinal number "k". The frequency distribution corrector 32 calculates a cumulative probability (frequency) corresponding to the prediction value "$p_k^{(t)}$" (first prediction value), based on the prediction value cumulative distribution function "$G_k^{(t)}$" (frequency data). Then, on the objective variable cumulative distribution function "$F^{(t)}$" (the frequency data on the observation values of the objective variable), the value "$q_k^{(t)}$" corresponding to the calculated cumulative probability (frequency) is calculated. The first prediction value is corrected based on the calculated value. As an example, the calculated value "$q_k^{(t)}$" itself is used for the corrected prediction value. Hereinafter, details will be described by using FIG. 6.

Figure 6:
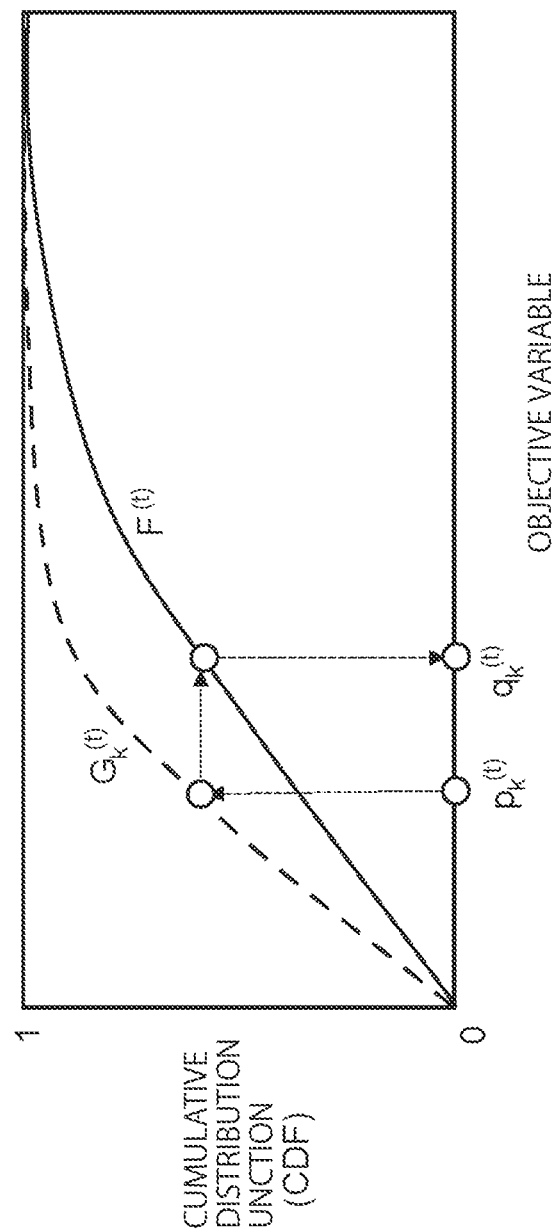
FIG. 6 is a diagram for describing correction performed by a frequency distribution corrector.

FIG. 6 is a diagram for describing the correction performed by the frequency distribution corrector 32. A horizontal axis shows values of the objective variable, and a vertical axis shows values of cumulative distribution function. Two graphs represent the objective variable cumulative distribution function "$F^{(t)}$" and the prediction value cumulative distribution function "$G_k^{(t)}$". If prediction values are correct, the two cumulative distribution functions are expected to match each other. However, the two graphs may possibly differ from each other in actuality, and such difference between the two graphs leads to a decrease in prediction accuracy. As shown in the drawing, the frequency distribution corrector 32 determines the corrected prediction value "$q_k^{(t)}$" such that $$F^{(t)}(q_k^{(t)}) = G_k^{(t)}(p_k^{(t)}) \quad (4)$$

In such a case, "$q_k^{(t)} - p_k^{(t)}$" corresponds to a correction amount.

Correction can be performed similarly when a probability density distribution, a histogram, or the like is used for the frequency data on the prediction values and the frequency data on the observation values. For example, a frequency or a probability corresponding to the prediction value "$p_k^{(t)}$" is identified from the frequency data on the prediction values, and a value of the objective variable corresponding to the identified frequency or probability is identified from the frequency data on the observation values. The identified value of the objective variable is used for the corrected prediction value "$q_k^{(t)}$".

Figure 7:
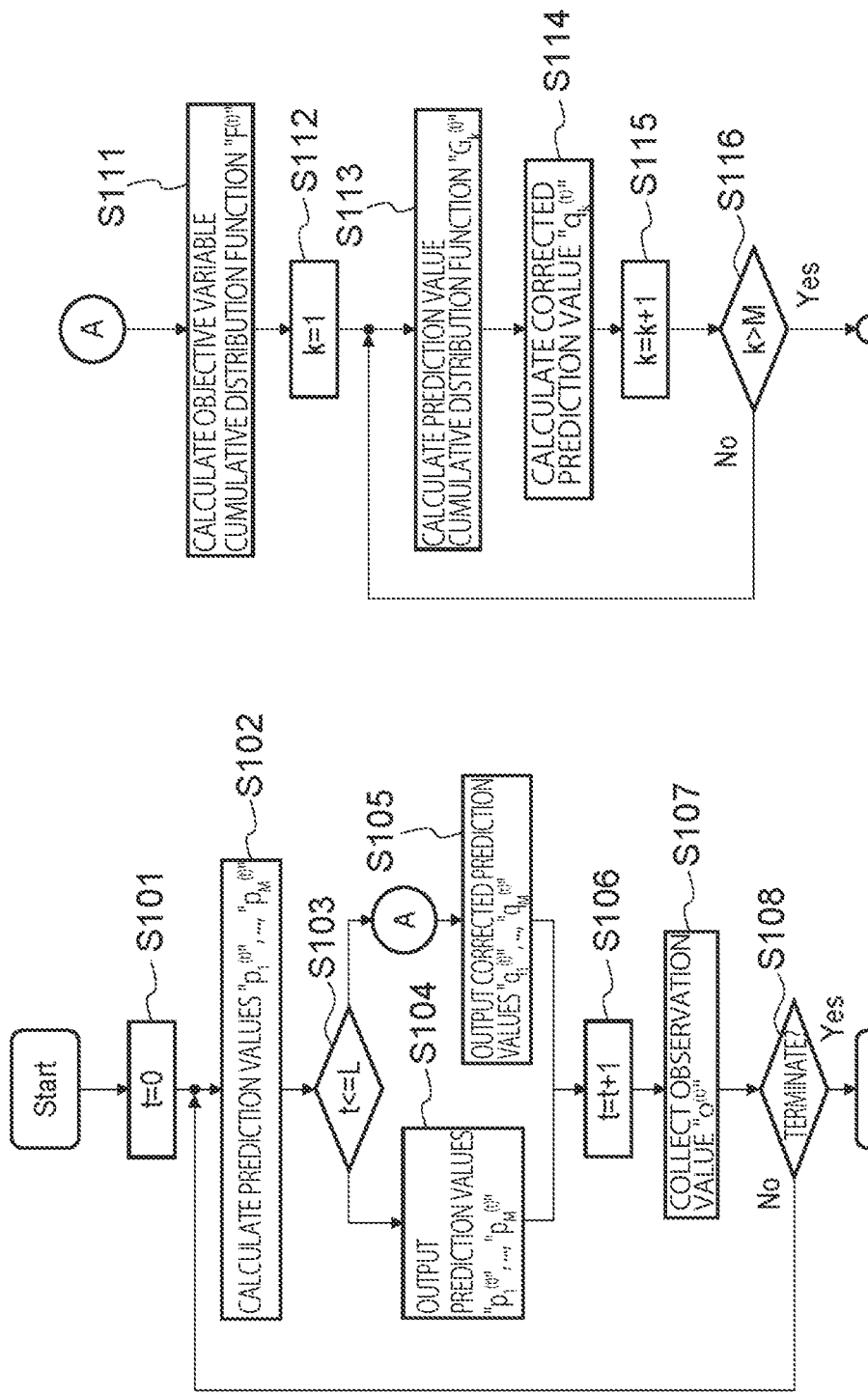
FIG. 7 is a flowchart of an example of operation of the prediction apparatus according to the first embodiment.

FIG. 7 is a flowchart of an example of prediction processing performed by the prediction apparatus 101 according to the first embodiment. First, on a supposition that operation of the prediction apparatus 101 starts at the time "t"=0, "t" is set to zero (S101), and the similar example selector 12 calculates the prediction values $\{p_1^{(t)}, p_2^{(t)}, \ldots, p_M^{(t)}\}$ before correction (S102). To perform correction, it is required to accumulate observation values and prediction values of the objective variable during the time period "L". It is determined whether or not t<L (S103). When t<L, the prediction corrector 15 outputs $\{p_1^{(t)}, p_2^{(t)}, \ldots, p_M^{(t)}\}$ as prediction values without correction (S104), on a supposition that sufficient data is not collected.

When t>=L, the objective variable cumulative distribution function estimator 21 in the prediction corrector 15 estimates "$F^{(t)}$" (Sill). Subsequently, it is set that k=1 (S112), and the prediction value cumulative distribution function estimator 31 in the member corrector k estimates "$G_k^{(t)}$" (S113). The frequency distribution corrector 32 corrects the prediction value "$p_k^{(t)}$" by using "$F^{(t)}$" and "$G_k^{(t)}$", and obtains the corrected prediction value "$q_k^{(t)}$" (S114). One is added to "k" (S115), and while "k" is not larger than "M" (No in S116), the processing returns to step S112. When the corrected prediction value "$q_k^{(t)}$" is obtained for every member with "k"=1, . . . , M (Yes in S116), a set of the corrected prediction values from the member correctors 1 to M are transmitted as ensemble prediction data to the output device 16 (S105). The output device 16 performs output processing such as displaying the ensemble prediction data on a screen or transmitting the ensemble prediction data to another device.

Thereafter, the objective variable acquirer 14 acquires an observation value "$o^{(t)}$". Specifically, at a time "t+1", the objective variable acquirer 14 acquires an observation value (S106, S107). In the example of predicting the solar irradiance at the point A on a next day (24 hours later), the time "t+1" corresponds to 24 hours later, and solar irradiance observed by the objective variable observation device 202 at the time 24 hours later is acquired. The prediction processing is repeated until a termination condition is fulfilled (S108). Examples of the termination condition include a case where "t" reaches a predetermined value, a case where an instruction about termination is inputted by an operator of the present apparatus, and the like.

As described above, according to the present embodiment, a set of prediction values that are values included in a plurality of similar examples are corrected based on the cumulative distribution function for observation values of the objective variable, and a set of the corrected prediction values are used for ensemble prediction data, whereby prediction performance can be enhanced. If the plurality of similar examples are far from current state data, a distribution of the prediction values differs from an intended distribution of prediction values. What is desired to be acquired as a distribution (dispersion) of prediction values is a dispersion of prediction values from a point of the current state data (the point C in FIG. 3) in the feature space. For example, even if the exactly same temperature, wind speed, and humidity are observed at the point A, each solar irradiance 24 hours later should vary, and what is desired to be known is how the solar irradiance vary. However, since a location of each prediction value is apart from the point of the current state data in the feature space, a distribution of the prediction values acquired from the feature space is different from an intended distribution of prediction values. The larger ordinal number a member has, the farther the member is from the point C in the feature space, and hence the more greatly the distribution of the prediction values deviates. In this respect, according to the present embodiment, each prediction value is corrected by using the cumulative distribution function for the observation values of the objective variable, whereby the above-described problem can be solved, and prediction performance can be enhanced.

Second Embodiment

In the above-described first embodiment, the frequency distribution corrector 32 acquires L data pieces up until the time point "t", and estimates the cumulative distribution functions "$F^{(t)}$", "$G_k^{(t)}$" (k=1, . . . , M). When the time period "L" is short, an error included in the estimated cumulative distribution functions may be great. In such a case, an error in the correction amount based on the cumulative distribution functions may be great, and may cause a decline in prediction performance. A second embodiment solves such a problem.

Figure 8:
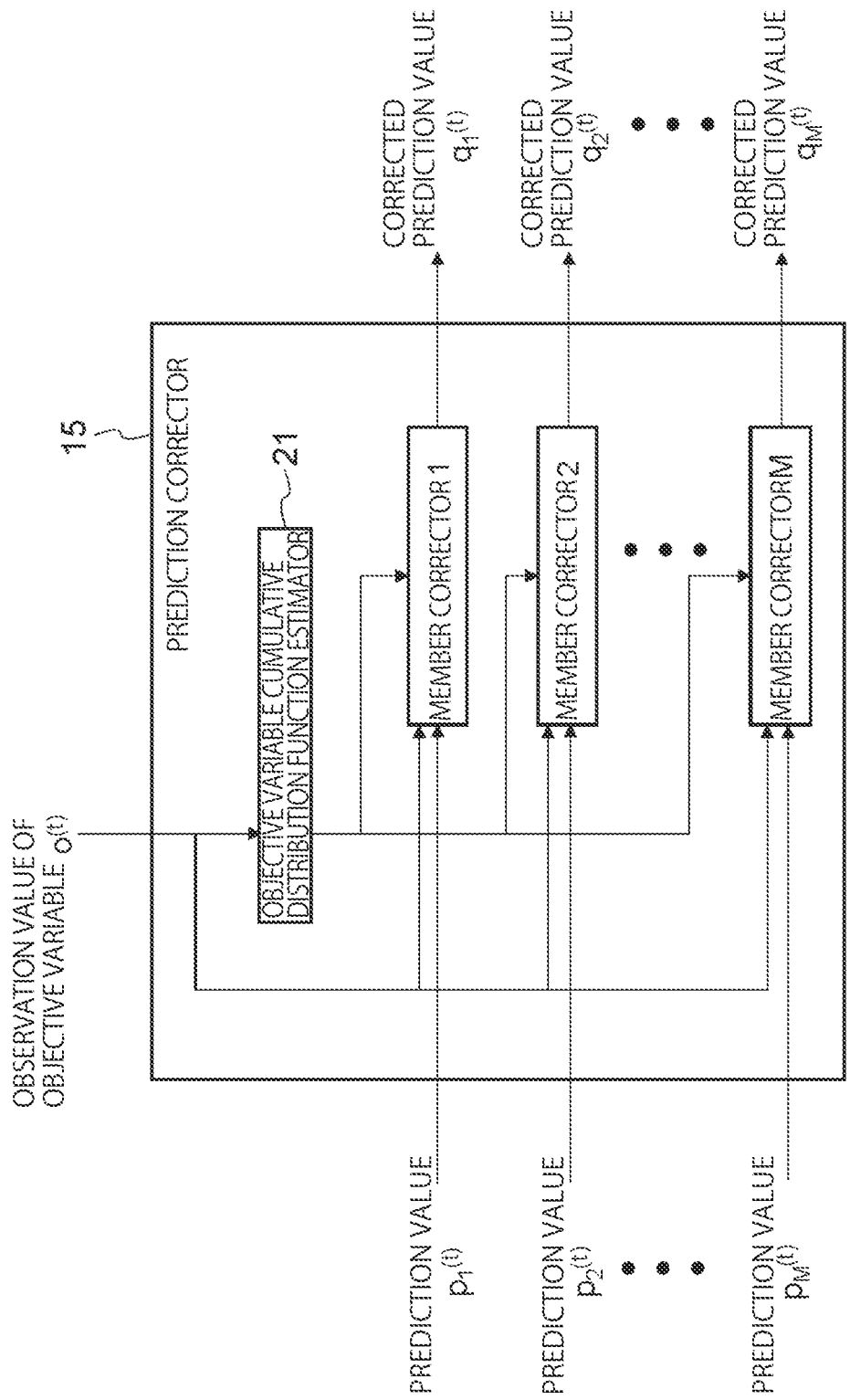
FIG. 8 is a block diagram of a prediction corrector in the prediction apparatus, according to a second embodiment.

FIG. 8 is a block diagram of a prediction corrector 15 in the prediction apparatus 101, according to a second embodiment. A difference from the first embodiment shown in FIG. 4 is that an observation value "$o^{(t)}$" of the objective variable acquired by the objective variable acquirer 14 is also given to the member correctors 1 to M.

Figure 9:
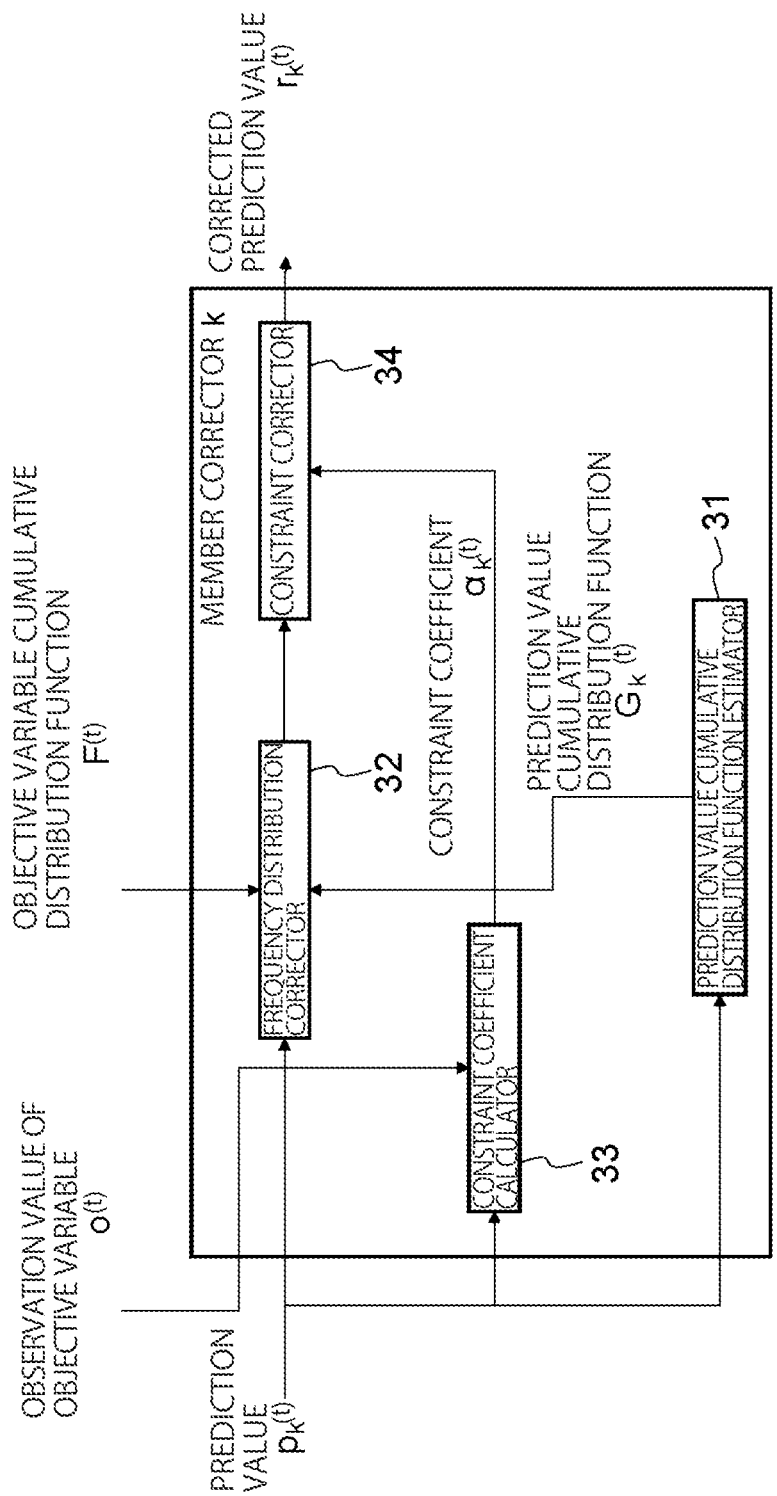
FIG. 9 is a block diagram of a member corrector according to the second embodiment.

FIG. 9 is a block diagram of a member corrector k (k=1 to M) according to the second embodiment. A difference from the member corrector in the first embodiment shown in FIG. 5 is that a constraint coefficient calculator 33 and a constraint corrector 34 are added.

[Constraint Coefficient Calculator 33]

The constraint coefficient calculator 33 calculates a cumulative probability corresponding to the prediction value "$p_k^{(t)}$" (first prediction value), based on the prediction value cumulative distribution function "$G_k^{(t)}$" (frequency data). Then, on the objective variable cumulative distribution function "$F^{(t)}$" (the frequency data on the observation values of the objective variable), the value "$q_k^{(t)}$" corresponding to the calculated cumulative probability is calculated. Based on a difference between the prediction value "$p_k^{(t)}$" and the value "$q_k^{(t)}$", a coefficient (constraint coefficient) is calculated. As an example, a performance evaluation index is calculated based on the difference, and the constraint coefficient is determined such that the performance evaluation index is optimized or quasi-optimized. The constraint corrector 34 (corrector) obtains a corrected prediction value "$r_k^{(t)}$", by multiplying the difference between the prediction value "$p_k^{(t)}$" and the value "$q_k^{(t)}$" by the constraint coefficient, and adding a resultant value of the multiplication to the prediction value "$p_k^{(t)}$", as will be described later.

As an example, the constraint coefficient calculator 33 calculates the constraint coefficient by using a method called cross-validation such that the predetermined performance evaluation index is optimized. The constraint coefficient calculator 33 acquires data $\{(o^{(t-L)}, p_k^{(t-L)}), \ldots, (o^{(t-1)}, p_k^{(t-1)})\}$ that is formed by pairing observation values $\{o^{(t-1)}, \ldots, o^{(t-1)}\}$ and prediction values $\{p_k^{(t-L)}, \ldots, p_k^{(t-1)}\}$ of the objective variable during the past time period "L" from the time point "t", at which prediction is performed, such that an observation value and a prediction value corresponding to the same time make a pair.

In the cross-validation method, data is divided into two sets, namely data for learning and data for validation. Although there are various methods for dividing data, a leave-one-out method, which is relatively commonly used, is used here. In such a case, the data for validation is only one pair of an observation value and a prediction value, and this one pair is assumed to be $(o_v, p_v)$. The remaining "L−1" pairs are the data for learning, and the data for learning are assumed to be $\{(o_l^{(1)}, p_l^{(1)}), \ldots, (o_l^{(L-1)}, p_l^{(L-1)})\}$.

As in the first embodiment, the objective variable cumulative distribution function estimator 21 calculates an objective variable cumulative distribution function "$F_l$" from the observation values in the data for learning. Similarly, the prediction value cumulative distribution function estimator 31 calculates a prediction value cumulative distribution function "$G_l$" from the prediction values in the data for learning. By using "$F_l$" and "$G_l$", a corrected prediction value "$q_v$" is calculated from a prediction value "$p_v$", through a method similar to the method used by the frequency distribution corrector 32 in the first embodiment.

The constraint coefficient calculator 33 first assumes a value "$\alpha$" of the constraint coefficient. For example, "$\alpha$" is selected from a fixed range (for example, a range between zero and one inclusive). Similarly to the constraint corrector 34, which will be described later, the constraint coefficient calculator 33 calculates a corrected prediction value "$r_v$", based on the tentatively determined constraint coefficient "$\alpha$". A prediction error is calculated from this "$r_v$" and the observation value "$o_v$", based on a following expression:

$$e = r_v - o_v \quad (5)$$

In such a manner, one error is obtained. In the leave-one-out method, when there are L pairs of data, division into the data for learning and the data for validation can be made in L different combinations. Accordingly, L errors can be obtained. It is assumed that the performance evaluation index to be optimized is, for example, RMSE (Root Mean Squared Error). In such a case, by using a set of the obtained errors, the RMSE can be calculated as follows:
[Expression 4]

$$RMSE = \sqrt{\frac{1}{L}\sum_{i=1}^{L} e_i^2} \quad (6)$$

Where "$e_i$" represents an error calculated based on an i-th combination for division into the data for learning and the data for validation. The RMSE depends on the assumed value "$\alpha$" of the constraint coefficient. In other words, the RMSE is a function for "$\alpha$". Accordingly, "$\alpha$" that minimizes or quasi-minimizes the RMSE can be selected by repeating calculation while variously changing the value of "$\alpha$". Quasi-minimization is, for example, to make the RMSE equal to or smaller than a threshold value. The value of the constraint coefficient calculated by the constraint coefficient calculator 33 in the member corrector k with respect to the time "t" is denoted by "$\alpha_k^{(t)}$".

There are various methods for dividing data into the data for learning and the data for validation, other than the leave-one-out method. Among commonly used methods, bootstrapping and the like using random numbers are known (see Bradley Efron and Robert J. Tibshirani, An Introduction to the Bootstrap, Chapman & Hall/CRC, 1993). Moreover, for the performance evaluation index to be optimized, various indices other than the RMSE can be used. CRPS (Continuously Ranked Probability Score) is well known in particular as a performance evaluation index in probabilistic prediction schemes (see Hans Hersbach, Decomposition of the Continuous Ranked Probability Score for Ensemble Prediction Systems, Weather and Forecasting, Vol. 15, Issue 5, pp. 559-570, 2000).
[Constraint Corrector 34]

The constraint corrector 34 performs correction as described below, by using the constraint coefficient "$\alpha_k^{(t)}$" ($0 \leq \alpha_k^{(t)} \leq 1$) calculated by the constraint coefficient calculator 33.

Figure 10:
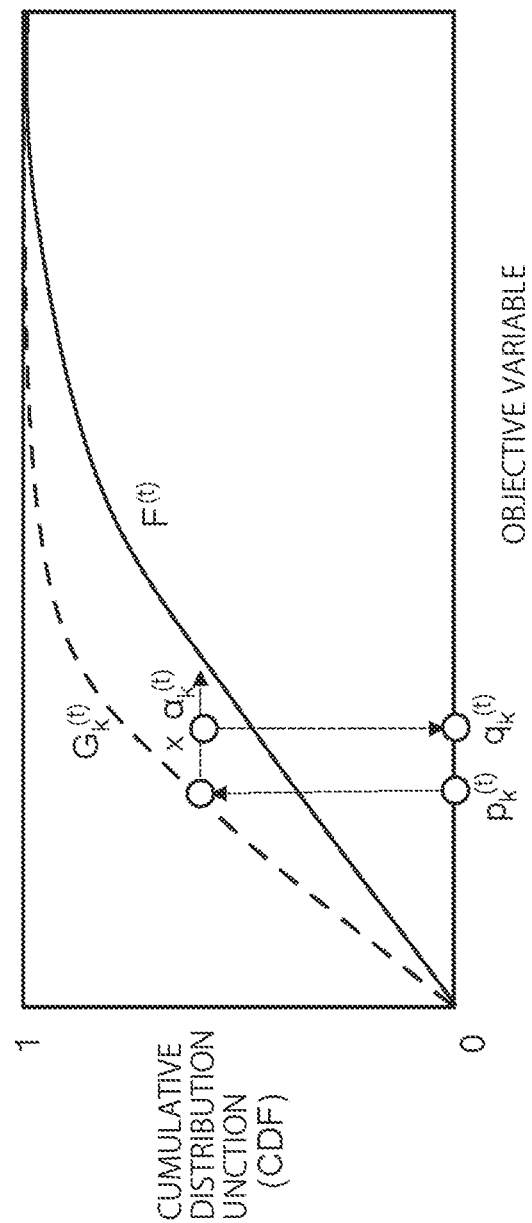
FIG. 10 is a diagram for describing correction performed by a constraint corrector 34.

FIG. 10 is a diagram for describing the correction performed by the constraint corrector 34.

First, based on the expression (1), a correction amount "$\delta p_k^{(t)}$" can be calculated based on a following expression:

$$\delta p_k^{(t)} = q_k^{(t)} - p_k^{(t)} \quad (7)$$

By multiplying the correction amount by the constraint coefficient "$\alpha_k^{(t)}$" and adding a resultant value of the multiplication to the prediction value "$p_k^{(t)}$", the prediction value "$r_k^{(t)}$" is calculated as follows:

$$r_k^{(t)} = p_k^{(t)} + \alpha_k^{(t)} \delta p_k^{(t)} \quad (8)$$

Data $\{r_1^{(t)}, r_2^{(t)}, \ldots, r_M^{(t)}\}$ that is a collection of the thus obtained prediction values is new ensemble prediction data.

As described above, according to the present embodiment, the correction amounts ($\delta p_k^{(t)} = q_k^{(t)} - p_k^{(t)}$) in the first embodiment are adjusted by using the constraint coefficients, whereby prediction performance can be enhanced.

Third Embodiment

In the first embodiment, the prediction corrector 15 collects observation values of the objective variable and prediction values of the objective variable, and estimates the objective variable cumulative distribution function and the prediction value cumulative distribution function (see FIGS. 4 and 5). However, in some cases, periodicity exists in values of the objective variable, depending on a subject that is predicted, and collection of observation values of the objective variable and prediction values of the objective variable can be omitted by utilizing such periodicity. For example, when a weather phenomenon is a subject, obvious periodicities exist, namely daily periodicity and annual periodicity.

Figure 11:
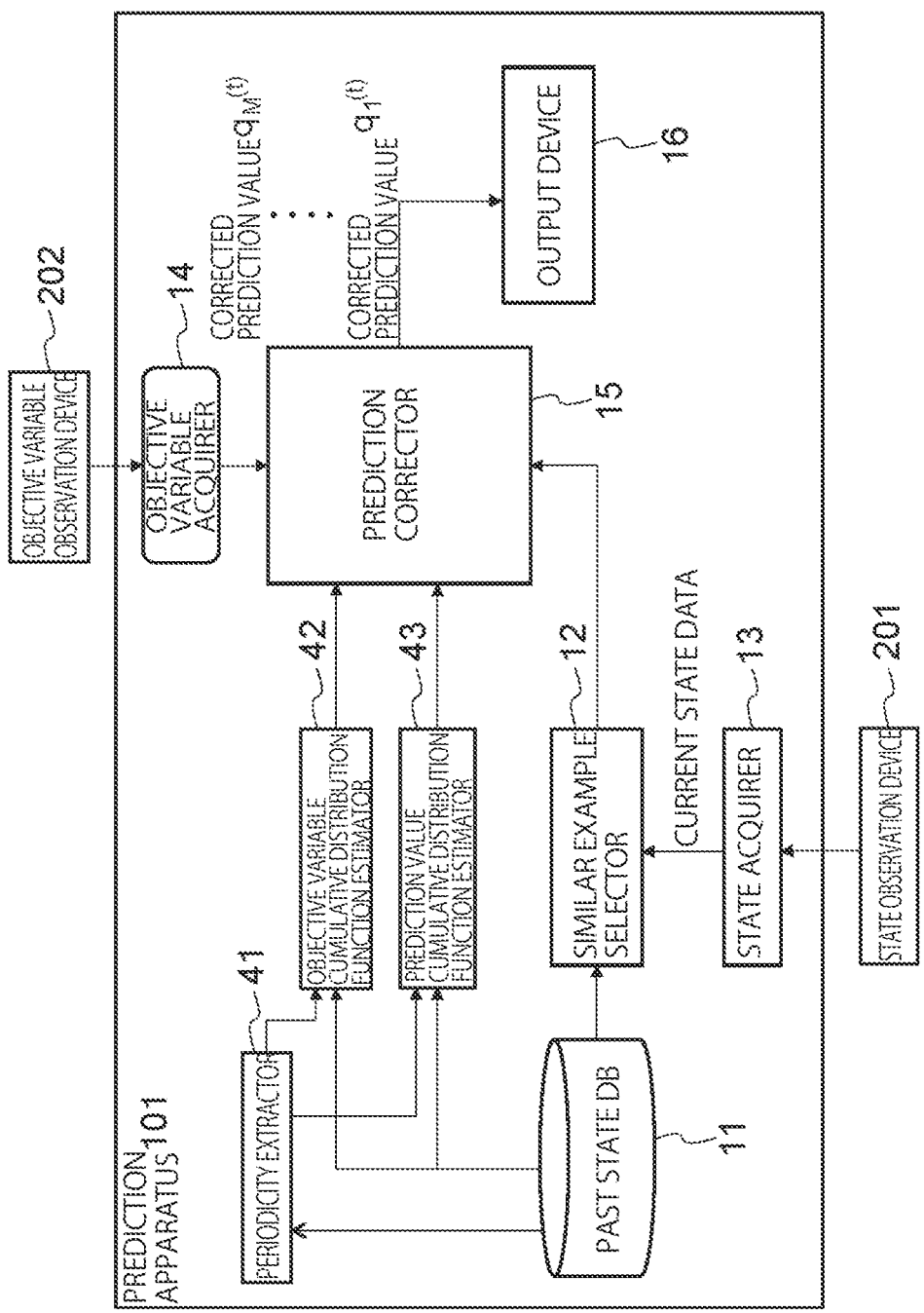
FIG. 11 is a block diagram of a prediction apparatus according to a third embodiment.

FIG. 11 is a block diagram of a prediction apparatus 101 according to a third embodiment. In comparison with the first embodiment, a periodicity extractor 41, an objective variable cumulative distribution function estimator 42, and a prediction value cumulative distribution function estimator 43 are added. The objective variable cumulative distribution function estimator 21 and the prediction value cumulative distribution function estimator 31 included in the prediction corrector 15 in the first embodiment are not required.
[Periodicity Extractor 41]

The periodicity extractor 41 identifies a time period associated with a current time (a time of the subject data) as a time period with periodicity of the current time. For example, the periodicity extractor 41 obtains a time period with similarity to the current time, based on a periodicity given beforehand. For example, it is assumed that the current time is day "d" of year "Y" ("d" is a day of the year). It is assumed that a width of the time period (assumed to be h days) and the number of years over which data is traced back (assumed to be n years) are predetermined. In such a case, the periodicity extractor 41 extracts similar segments as follows. Here, an example is shown where annual periodicity is utilized.

[day "d−h" of year "Y−1" to day "d+h" of year "Y−1"]
[day "d−h" of year "Y−2" to day "d+h" of year "Y−2"]
[day "d−h" of year "Y−n" to day "d+h" of year "Y−n"]

The periodicity extractor 41 provides information on the extracted similar segments (time periods) to the objective variable cumulative distribution function estimator 42 and the prediction value cumulative distribution function estimator 43.

[Objective Variable Cumulative Distribution Function Estimator 42]

The objective variable cumulative distribution function estimator 42 extracts, from the past state DB 11, a value of the objective variable included in each case belonging to each similar segment provided by the periodicity extractor 41. In other words, observation values belonging to the similar segments, in a history of values (observation values) of the objective variable, are extracted. Based on the extracted observation values, the objective variable cumulative distribution function estimator 42 estimates an objective variable cumulative distribution function (frequency data on the observation values of the objective variable), through a method similar to the method used by the objective variable cumulative distribution function estimator 21 in the first embodiment. The estimated objective variable cumulative distribution function is provided to each member corrector k (k=1 to M) in the prediction corrector 15.

[Prediction Value Cumulative Distribution Function Estimator 43]

The prediction value cumulative distribution function estimator 43 calculates a prediction value for each time included in the similar segments provided by the periodicity extractor 41, individually for each member ranking as in the first embodiment, and obtains histories of the prediction values (histories of selection of members (cases) with the same ranking). Based on the histories of the prediction values, the prediction value cumulative distribution function estimator 43 estimates prediction value cumulative distribution functions. The prediction value cumulative distribution functions that are estimated for the member rankings, respectively, are provided to the frequency distribution correctors 32 of the corresponding member correctors k in the prediction corrector 15.

[Other Examples of Configuration of Periodicity Extractor 41]

When a periodicity is not given beforehand, the periodicity extractor 41 analyzes the past state DB 11 and detects a periodicity. The periodicity extractor 41 extracts a similar segment by utilizing the detected periodicity.

Figure 12:
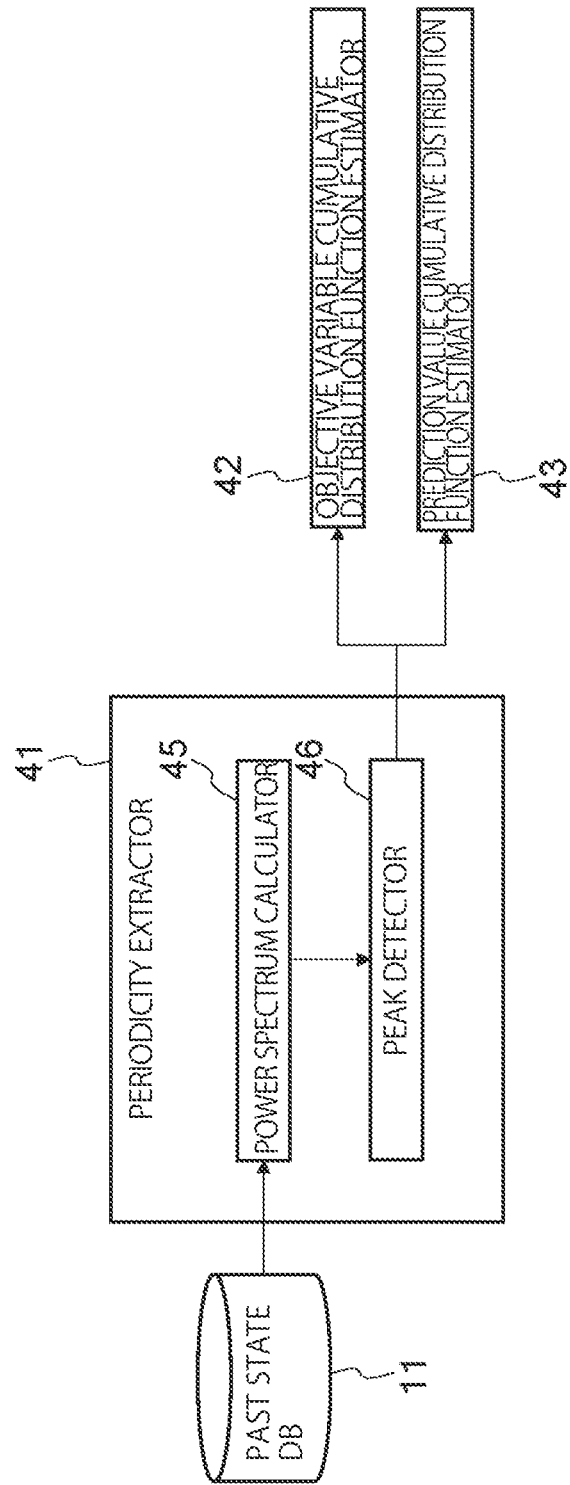
FIG. 12 is a block diagram of a periodicity extractor.

FIG. 12 is a block diagram of the periodicity extractor 41. The periodicity extractor 41 includes a power spectrum calculator and a peak detector 46.

[Power Spectrum Calculator 45]

The power spectrum calculator 45 reads past values of the objective variable as time-series data from the past state DB 11, and calculates a power spectrum based on the read time-series data. In other words, the power spectrum calculator 45 calculates a power spectrum, based on a history of observation values of the objective variable. The power spectrum represents absolute values of amplitude (spectrum component) of frequency components corresponding to the values that change like time series. If the power spectrum has a large value at some frequency "ω", such a fact means that a large number of components of that frequency are included in the objective variable.

[Peak Detector]

The peak detector 46 performs peak detection based on the power spectrum, identifies a frequency component "ω" among frequency components included in the peak detected through the peak detection, and identifies a peak width "Δω". Based on the identified frequency component to and peak width "Δω", a similar segment (time period) is determined. The frequency component "ω" is a frequency component selected from among the frequency components included in the peak. As an example, the frequency component "ω" is a frequency component with the largest spectrum component among the frequency components included in the peak. As another example, a median value or the like of the frequency components included in the peak may be selected.

Having a peak that includes a large spectrum component corresponding to a first frequency component "ω" suggests that the objective variable has a periodicity with a period "τ"=2π/ω. The peak width "Δω" relates to precision of the periodicity. For example, a narrow peak width "Δω" indicates precise periodicity. Accordingly, "Δω" can be thought to suggest a width of an interval to be set as a similar segment. Here, it is assumed that the width of the interval is "Δτ"=2πΔω/ω². As an example, following segments are determined as similar segments.

[t−τ−Δτ to t−T+Δτ]

[t−2τ−Δτ to t−2τ+Δτ]

[t−nτ−Δτ to t−nτ+Δτ]

As described above, according to the present embodiment, the cumulative distribution functions are estimated based on periodicity of the objective variable by using the past state DB 11, whereby collection of observation values of the objective variable and prediction values of the objective variable can be omitted. Accordingly, after the prediction apparatus starts operation, correction of the prediction values (see S105 of the flowchart in FIG. 7) can be performed earlier.

Fourth Embodiment

In the first embodiment, the frequency distribution corrector 32 of each member corrector corrects the prediction value "$p_k^{(t)}$" to "$q_k^{(t)}$". The correction amount $(p_k^{(t)} - q_k^{(t)})$ depends on a system (metric) of measuring a distance in the feature space. There are various metrics other than the Euclidean distance used in the first embodiment. By appropriately selecting a metric, there is a possibility that prediction performance can be enhanced.

In a fourth embodiment, a plurality of metrics are preset, and correction of prediction values is performed for each metric. For each metric, a summed value of correction amounts is calculated, and corrected prediction values based on a metric for which the smallest summed value is obtained are adopted. Hereinafter, details of the present embodiment will be described.

Figure 13:
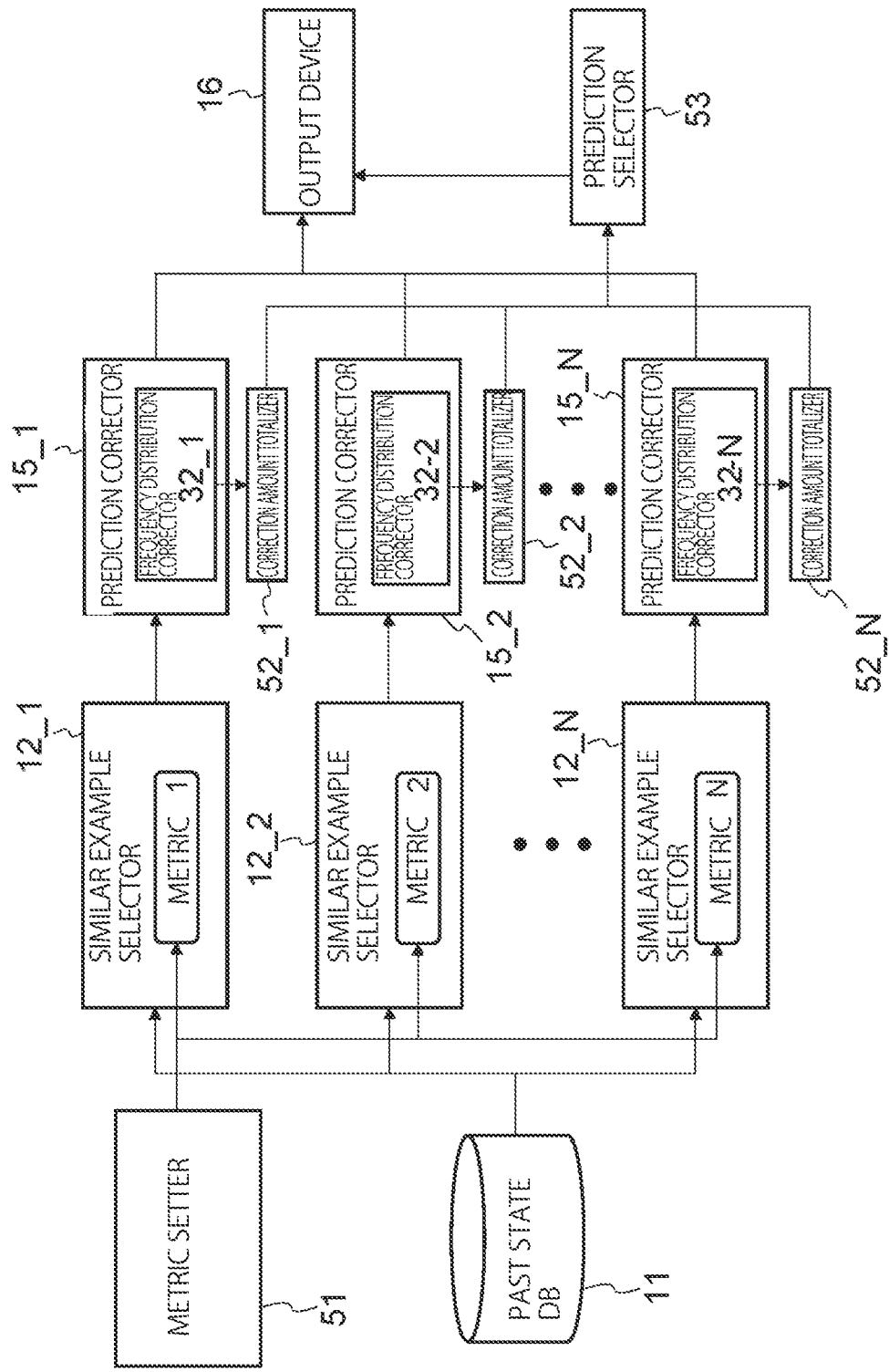
FIG. 13 is a block diagram of a prediction apparatus according to a fourth embodiment.

FIG. 13 is a block diagram of a prediction apparatus 101 in the fourth embodiment. In comparison with the prediction apparatus in the first embodiment, a metric setter 51 and a prediction selector 53 (set selector) are added. Moreover, N pairs of similar example selectors 12 and prediction correctors 15 are included. In other words, a pair of a similar example selector 12_1 and a prediction corrector 15_1 to a pair of a similar example selector 12_N and a prediction corrector 15_N are included. For the N pairs, correction amount totalizers 52_1 to 52_N are provided, respectively.

[Metric Setter 51]

The metric setter 51 sets metrics to be used by the similar example selectors 12_1 to 12_N (presented as metrics 1 to N, respectively).

In the present embodiment, an example is shown where a weighted distance is used for a metric. In such a case, for each of the metrics 1 to N, a weight for each feature is inputted.

Assuming that a weighted distance between sets of features "X"=$(x_1, \ldots, x_N)$ and "Y"=$(y_1, \ldots, y_N)$ is "d", the weighted distance is calculated as follows:

[Expression 9]

$$d = \sqrt{\sum_{i=1}^{N} w_i (x_i - y_i)^2} \qquad (9)$$

Where "$w_i$" is a weight for an i-th feature, and a feature with a larger value of "$w_i$" is deemed to be of greater importance in calculation. The various metrics 1 to N are configured by variously changing the value of "$w_i$".

The similar example selectors 12_1 to 12_N and the prediction correctors 15_1 to 15_N operate as in the first embodiment, except that metrics used by the similar example selectors 12_1 to 12_N are different. In other words, the similar example selectors 12_1 to 12_N select similar examples by using mutually different metrics. The prediction correctors 15_1 to 15_N correct prediction values that are values of the objective variable included in the similar examples selected by the similar example selectors 12_1 to 12_N.

[Correction Amount Totalizers 52_1 to 52_N]

The correction amount totalizers 52_1 to 52_N sum (or total) the correction amounts $\delta p_k^{(\tau)}$ for correction performed by the frequency distribution correctors 32_1 to 32_N in the prediction corrector 15_1 to 15_N. For example, assuming that a predetermined time period is "R" and a time at which prediction is performed is "t", a sum "S" of absolute values of the correction amounts in a segment [t–R, t–1] is calculated as follows:

[Expression 9]

$$S = \sum_{\tau=1}^{R} |\delta p_k^{(t-\tau)}| \qquad (10)$$

The thus calculated "S" is a scale that represents a magnitude of the correction. Hereinafter, this "S" will be referred to as a correction amount summed value. A correction amount summed value corresponding to a j-th metric is denoted by "$S_j$".

In the above-described example, absolute values of the correction amounts are used when a correction amount summed value is calculated. Apart from the absolute value, an amount that can be a scale of a magnitude of the correction amount, for example, a square of the correction amount can also be used.

[Prediction Selector 53]

The prediction selector 53 selects a metric (or a pair of a similar example selector and a prediction corrector) with which the smallest correction amount summed value is obtained. In other words, a metric (or a pair of a similar example selector and a prediction corrector) is selected with which, among the correction amount summed values "$S_1$", ..., "$S_N$", the smallest "$S_j$" is obtained. A number denoting the selected metric (or pair) is assumed to be "$j_{min}$". The prediction selector 53 generates instructional data to instruct that ensemble prediction data from a $j_{min}$-th prediction corrector 15 (prediction corrector 15_$j_{min}$) be selected, and provides the instructional data to the output device 16.

[Output Device 16]

The output device 16, in accordance with the instructional data from the prediction selector 53, outputs the ensemble prediction data from the $j_{min}$-th prediction corrector 15 (prediction corrector 15_$j_{min}$) among outputs from the N prediction correctors 15.

Figure 14:
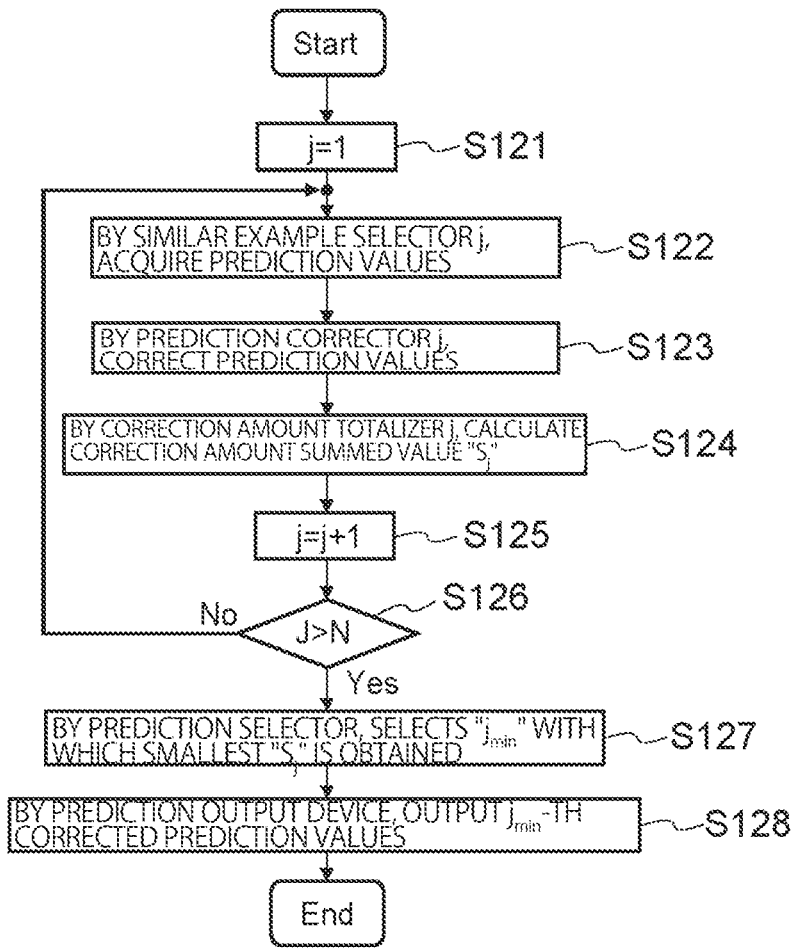
FIG. 14 is a flowchart of an example of operation of the prediction apparatus according to the fourth embodiment.

FIG. 14 is a flowchart of an example of prediction processing performed the prediction apparatus 101 according to the fourth embodiment. In a description below, it is assumed that a similar example selector j represents a similar example selector 12_j, a prediction corrector j represents a prediction corrector 15_j, and a correction amount totalizer j represents a correction amount totalizer 52_j.

First, it is set that j=1 (S121), the similar example selector j acquires a plurality of prediction values, based on similar cases (S122), and the prediction corrector j corrects the plurality of prediction values (S123). The correction amount totalizer j calculates a correction amount summed value $S_j$ (S124). One is added to "j" (S125), and steps S122 to S125 are repeated until "j" reaches "N" (S126). When "j" reaches "N", the prediction selector 53 selects a number $j_{min}$ of a metric (or a pair of a similar example selector and a prediction corrector) with which the smallest correction amount summed value $S_j$ is obtained (S127). The output device 16 outputs a set of corrected prediction values (ensemble prediction data) from the $j_{min}$-th prediction corrector 15 (S128).

As described above, according to the present embodiment, prediction values are acquired based on a plurality of metrics, the prediction values are corrected, and corrected prediction values with which the smallest summed value of correction amounts is obtained are selected, whereby prediction performance can be enhanced.

Fifth Embodiment

In the first embodiment, for a state (one or more features) of the subject system, one or more observation values of the subject system at a certain time point are used. For example, in a case of weather prediction, a temperature, an atmospheric pressure, and the like at a point of interest correspond to a state of the subject system. However, when a case of predicting the solar irradiance on a next day is taken as an example, an actual solar irradiance on the next day does not always well agree with solar irradiance in a selected case even if a past state that is similar to current meteorological variables is selected. This is because solar irradiance at any point of interest on a next day is determined under influence of not only current meteorological variables at the point of interest but also current meteorological variables in a wider area. It is uncertain what meteorological variable at which point should be used for comparison, to obtain more desirable similarity.

In view of such circumstances, in a field of weather prediction, a technique called analog ensemble is known. This technique is based on a fact that numerical weather calculation with high prediction performance is available for weather prediction. According to a basic concept of the analog ensemble, if numerical weather calculation with high prediction performance is possible, more desirable similarity can be obtained by selecting similar meteorological variables to meteorological variables at a target time point of prediction, which are derived by calculation from current meteorological variables, than by comparison with the current meteorological variables. The numerical weather calculation does not always predict accurate values, but nevertheless past studies show that the concept of the analog ensemble is effective (see Luca Delle Monache, F Anthony Eckel, Daran L Rife, Badrinath Nagarajan, and Keith Searight, Probabilistic Weather Prediction with an Analog Ensemble, Monthly Weather Review, Vol. 141, Issue 10, pp. 3498-3516, 2013).

The concept of the analog ensemble used for weather prediction can be applied to situations where numerical calculation or numerical model simulation can be used in general. A fifth embodiment embodies a configuration that adopts a concept of using numerical calculation.

Figure 15:
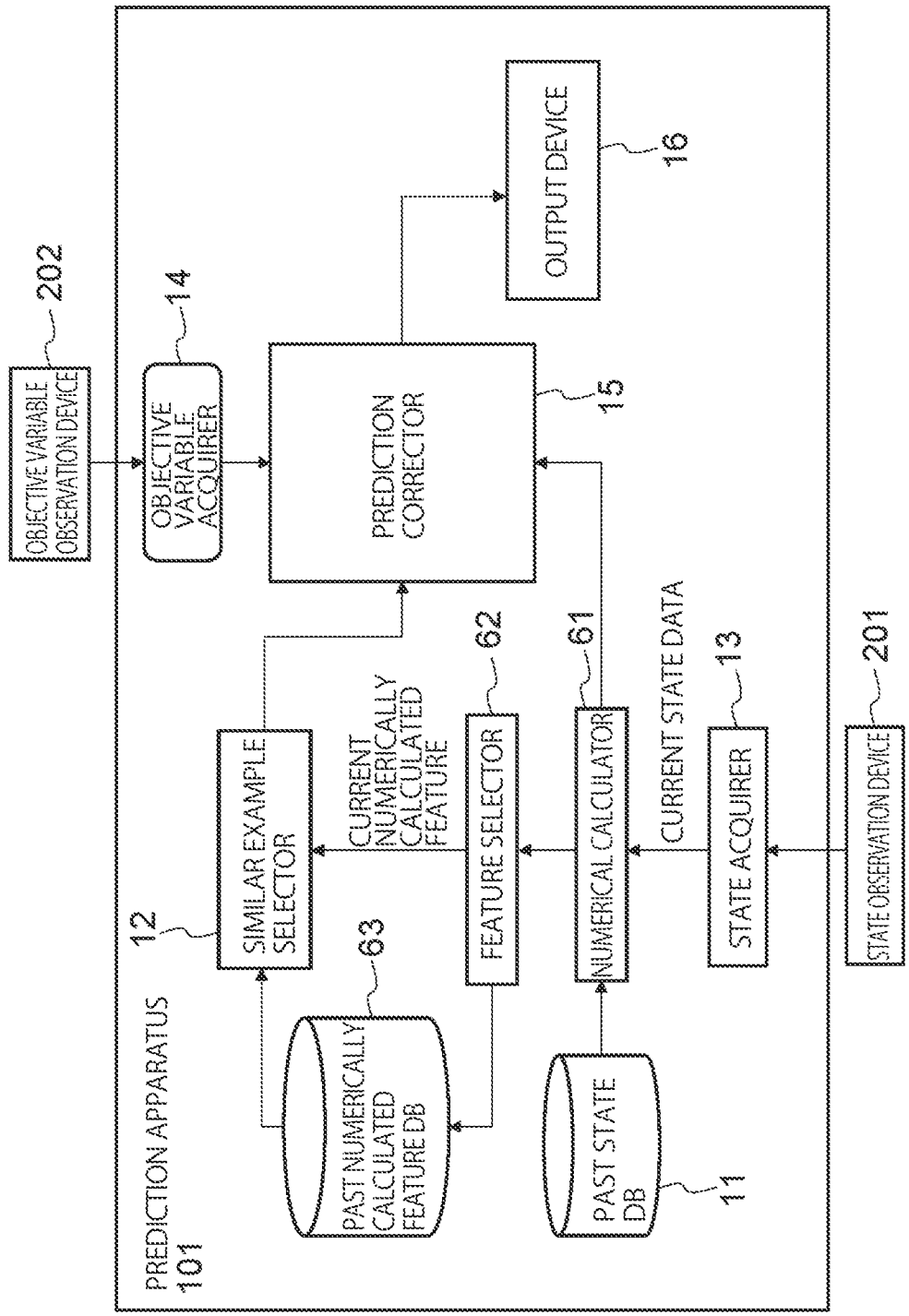
FIG. 15 is a block diagram of a prediction apparatus according to a fifth embodiment.

FIG. 15 is a block diagram of a prediction apparatus 101 according to the fifth embodiment. In comparison with the first embodiment, a numerical calculator 61, a feature selector 62, and a past numerically calculated feature DB 63 are added.

[Numerical Calculator 61]

The numerical calculator 61 performs numerical calculation of a state of the subject system at a target time point of prediction from data (current state data) indicating a current state of the subject system, based on a numerical calculation model. A plurality of features are obtained through the numerical calculation. The numerical calculator 61 performs numerical calculation from a past state (features) of the subject system stored in the past state DB 11, based on the numerical calculation model. A plurality of features are obtained through the numerical calculation.

[Feature Selector 62]

The feature selector 62 selects a feature (numerically calculated feature) to be used to acquire a similar example, among the plurality of features obtained through the numerical calculation from the past state DB 11, and stores the selected numerically calculated feature in the past numerically calculated feature DB 63. The numerically calculated feature may be a feature of the same type as the objective variable. For example, when prediction of the solar irradiance is taken as an example, the numerically calculated feature may be a value of the solar irradiance. In addition, for example, a numerically calculated feature deemed to be useful for determination of similarity may be appropriately selected and added to the past numerically calculated feature DB 63.

The feature selector 62 selects a feature (numerically calculated feature) to be used to acquire a similar example, among the plurality of features obtained through the numerical calculation with respect to the current state data. The selected numerically calculated feature (current numerically calculated feature) is provided to the similar example selector 12. The selected feature may be a feature of the same type as the feature stored in the past numerically calculated feature DB 63. In a case of predicting the solar irradiance at the point A on a next day as an example, when a value of the solar irradiance is stored as a numerically calculated feature in the past numerically calculated feature DB 63, a value of the solar irradiance at the point A on a next day is selected as a numerically calculated feature. In addition, another numerically calculated feature such as a temperature, a humidity, or the like at the point A on the next day may be selected, depending on contents of the past numerically calculated feature DB 63.

[Past Numerically Calculated Feature DB63]

The past numerically calculated feature DB 63 stores, in a set with a value of the objective variable, the one or more features (numerically calculated features) selected by the feature selector 62 among the plurality of features obtained through the numerical calculation from the past state DB 11.

FIG. 16 shows an example of the past numerically calculated feature DB 63. Numerically calculated features 1 to N are stored in association with a time and a value of the objective variable.

The similar example selector 12 operates as in the first embodiment, except that the current state data and the past state DB 11 in the first embodiment are replaced with the current numerically calculated feature and the past numerically calculated feature DB 63, respectively. The prediction corrector 15, the objective variable acquirer 14, and the output device 16 also operate as in the first embodiment.

As described above, according to the present embodiment, a feature (numerically calculated feature) is calculated through numerical calculation, whereby prediction performance can be enhanced.

(Hardware Configuration)

Figure 17:
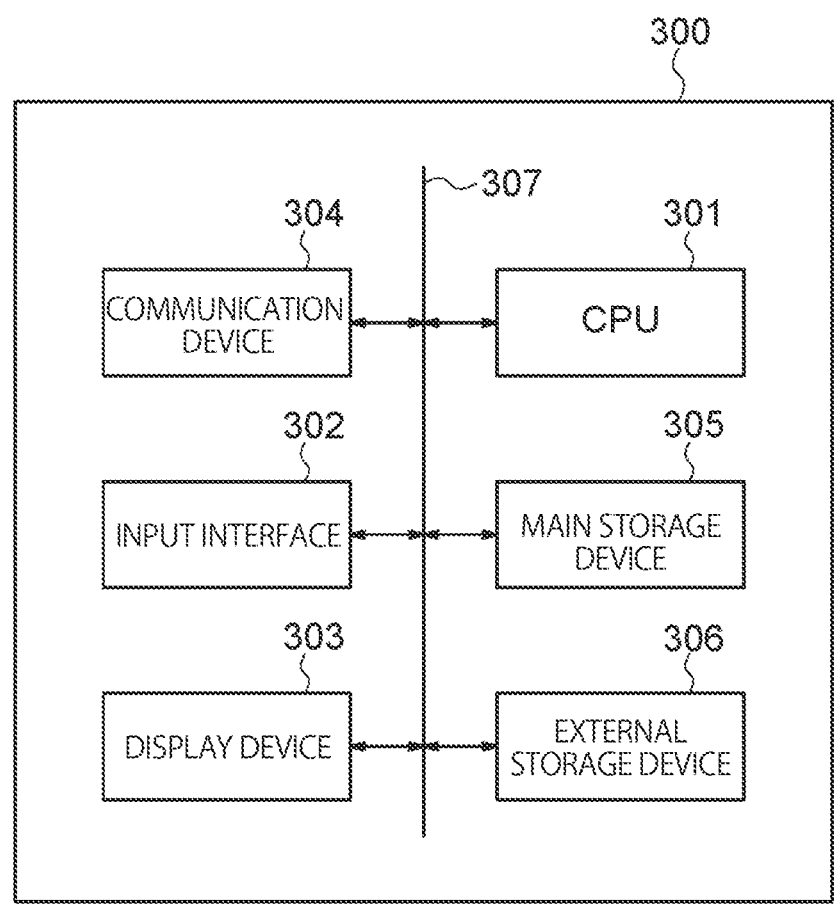
FIG. 17 shows a hardware configuration of any of the prediction apparatuses (information processing apparatuses) according to the embodiments.

FIG. 17 illustrates a hardware configuration of the prediction apparatus (information processing apparatus) 101 according to the present embodiment. The information processing apparatus 101 according to the present embodiment is configured with a computer device 300. The computer device 300 includes a CPU 301, an input interface 302, a display device 303, a communication device 304, a main storage device 305 and an external storage device 306, and these are connected to each other with a bus 307.

The CPU (Central Processing Unit) 301 executes a computer program (prediction program) which realizes the above-described respective functional configurations of the information processing apparatus 101 on the main storage device 305. The computer program may not be a single program but a plurality of programs or a combination of scripts. By the CPU 301 executing the computer program, the respective functional configurations are realized.

The input interface 302 is a circuit for inputting an operation signal from the input device such as a keyboard, a mouse and a touch panel, to the information processing apparatus 101. The input function of the information processing apparatus 101 can be constructed on the input interface 302.

The display device 303 displays data or information output from the information processing apparatus 101. While the display device 303 is, for example, an LCD (Liquid Crystal Display), a CRT (Cathode-Ray Tube), and a PDP (Plasma Display Panel), the display device 303 is not limited to this. The data or the information output from the computer device 300 can be displayed by this display device 303. The output device of the information processing apparatus 101 can be constructed on the display device 303.

The communication device 304 is a circuit for the information processing apparatus 101 to communicate with an external device in a wireless or wired manner. Information can be input from the external device via the communication device 304. Information input from the external device can be stored in a DB.

The main storage device 305 stores a program (prediction program) which realizes processing of the present embodiment, data required for execution of the program, data generated by execution of the program, and the like. The program is developed and executed on the main storage device 305. While the main storage device 305 is, for example, a RAM, a DRAM and an SRAM, the main storage device 305 is not limited to this. The storage in each embodiment may be constructed on the main storage device 305.

The external storage device 306 stores the above-described program, data required for execution of the program, data generated by execution of the program, and the like. These kinds of program and data are read out to the main storage device 305 upon processing of the present embodiment. While the external storage device 306 is, for example, a hard disk, an optical disk, a flash memory and a magnetic tape, the external storage device 306 is not limited to this. The storage in each embodiment may be constructed on the external storage device 306.

Note that the above-described program may be installed in the computer device 300 in advance or may be stored in a storage medium such as a CD-ROM. Further, the program may be uploaded on the Internet.

Note that the computer device 300 may include one or a plurality of the processors 301, the input interfaces 302, the display devices 303, the communication devices 304 and the main storage devices 305, or peripheral equipment such as a printer and a scanner may be connected to the computer device 300.

Further, the information processing apparatus 101 may be configured with a single computer device 300 or may be configured as a system including a plurality of computer devices 300 which are connected to each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
a processor configured to select a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;
a first estimator configured to estimate frequency data indicating frequencies of observation values of the objective variable, based on a history of observation values of the objective variable, the frequency data being a cumulative distribution function, a probability density distribution, or a histogram;
a second estimator configured to estimate first frequency data indicating frequencies of first prediction values, based on a history of first prediction values acquired before the first prediction value is acquired, the first frequency data being a cumulative distribution function, a probability density distribution, or a histogram; and
a corrector configured to correct the first prediction value acquired by the processor, based on the frequency data and the first frequency data to obtain a predicted value of the weather state after the predetermined time from the current time,
wherein
the processor is configured to further select second to k-th cases, and acquire second to k-th prediction values that are values of the objective variable included in the second to k-th cases, respectively,
the second estimator is configured to estimate second to k-th frequency data indicating frequencies of the second to k-th prediction values, based on histories of the second to k-th prediction values, and
the corrector is configured to correct the second to k-th prediction values acquired by the processor, based on the frequency data and the second to k-th frequency data, respectively.

2. The information processing apparatus according to claim 1, wherein the processor is configured to select the first case, based on a distance between the subject data and the first data included in each of the plurality of cases.

3. The information processing apparatus according to claim 1, wherein
the first to k-th cases have rankings according to a distance between the first data included in each of the first to k-th cases and the subject data.

4. The information processing apparatus according to claim 1, further comprising a feature generator configured to generate the at least one feature, based on at least one state amount, by performing numerical calculation based on a numerical calculation model.

5. The information processing apparatus according to claim 1, wherein the frequency data includes a cumulative distribution function for observation values of the objective variable.

6. The information processing apparatus according to claim 1, wherein the first frequency data includes a cumulative distribution function for the first prediction values.

7. An information processing apparatus comprising:
a processor configured to select a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;
a first estimator configured to estimate frequency data indicating frequencies of observation values of the objective variable, based on a history of observation values of the objective variable, the frequency data being a cumulative distribution function, a probability density distribution, or a histogram;
a second estimator configured to estimate first frequency data indicating frequencies of first prediction values, based on a history of first prediction values acquired before the first prediction value is acquired, the first frequency data being a cumulative distribution function, a probability density distribution, or a histogram; and
a corrector configured to correct the first prediction value acquired by the processor, based on the frequency data and the first frequency data to obtain a predicted value of the weather state after the predetermined time from the current time, wherein the corrector is configured to
calculate a frequency corresponding to the first prediction value acquired by the processor, based on the first frequency data;
calculate an observation value corresponding to the calculated frequency, on the frequency data; and
correct the first prediction value, based on the calculated observation value.

8. The information processing apparatus according to claim 7, wherein the corrector is configured to correct the first prediction value to a value that is equal to the calculated observation value.

9. The information processing apparatus according to claim 7, further comprising an objective variable acquirer configured to acquire an observation value of the objective variable, from an observation device that observes the objective variable,
wherein the corrector is configured to
calculate a coefficient, based on a difference between the first prediction value acquired by the processor and the acquired observation value; and
correct the first prediction value by adding, to the first prediction value, a value obtained by multiplying the difference by the coefficient.

10. The information processing apparatus according to claim 9, wherein the corrector is configured to calculate a performance evaluation index, based on the difference between the first prediction value acquired by the processor and the acquired observation value, and determine the coefficient, based on the performance evaluation index.

11. An information processing apparatus, comprising:
a processor configured to select a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;
a first estimator configured to estimate frequency data indicating frequencies of observation values of the objective variable, based on a history of observation values of the objective variable, the frequency data being a cumulative distribution function, a probability density distribution, or a histogram;
a second estimator configured to estimate first frequency data indicating frequencies of first prediction values, based on a history of first prediction values acquired before the first prediction value is acquired, the first frequency data being a cumulative distribution function, a probability density distribution, or a histogram; and
a corrector configured to correct the first prediction value acquired by the processor, based on the frequency data and the first frequency data to obtain a predicted value of the weather state after the predetermined time from the current time,
wherein
the plurality of cases are associated with a plurality of times, respectively,
the processor is configured to select the first case from cases belonging to a time period associated with a time of the subject data, and
the first estimator is configured to estimate the frequency data, based on observation values belonging to the time period in a history of observation values of the objective variable.

12. The information processing apparatus according to claim 11, wherein the time period is a time period based on periodicity of the objective variable.

13. The information processing apparatus according to claim 12, further comprising:
a power spectrum calculator configured to calculate a power spectrum, based on the history of the observation values of the objective variable; and
a peak detector configured to perform peak detection, based on the power spectrum, and determine the time period, based on a frequency component included in a peak detected through the peak detection, and based on a width of the peak.

14. An information processing apparatus, comprising:
a processor configured to select a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;
a first estimator configured to estimate frequency data indicating frequencies of observation values of the objective variable, based on a history of observation values of the objective variable, the frequency data being a cumulative distribution function, a probability density distribution, or a histogram;
a second estimator configured to estimate first frequency data indicating frequencies of first prediction values, based on a history of first prediction values acquired before the first prediction value is acquired, the first frequency data being a cumulative distribution function, a probability density distribution, or a histogram; and
a corrector configured to correct the first prediction value acquired by the processor, based on the frequency data and the first frequency data to obtain a predicted value of the weather state after the predetermined time from the current time,
wherein the information processing apparatus comprises a plurality of sets of the processor, the first estimator, the second estimator, and the corrector,
wherein the processors in the plurality of sets each select the first case by using different metrics, and
the information processing apparatus further comprises:
a plurality of correction amount totalizers configured to sum correction amounts for the first prediction values corrected by the correctors, respectively;
a set selector configured to select a set from among the plurality of sets, based on summed values of the correction amounts; and
an output device configured to output the first prediction value corrected by the corrector in the set selected.

15. An information processing method, comprising:
selecting a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;

estimating frequency data indicating frequencies of observation values of the objective variable, based on a history of observation values of the objective variable, the frequency data being a cumulative distribution function, a probability density distribution, or a histogram;

estimating first frequency data indicating frequencies of first prediction values, based on a history of first prediction values acquired before the first prediction value is acquired, the first frequency data being a cumulative distribution function, a probability density distribution, or a histogram; and correcting the first prediction value acquired by the processor, based on the frequency data and the first frequency data to obtain a predicted value of the weather state after the predetermined time from the current time;

selecting second to k-th cases, and acquire second to k-th prediction values that are values of the objective variable included in the second to k-th cases, respectively;

estimating second to k-th frequency data indicating frequencies of the second to k-th prediction values, based on histories of the second to k-th prediction values; and correcting the second to k-th prediction values acquired by the processor, based on the frequency data and the second to k-th frequency data, respectively.

16. A non-transitory computer readable medium having a computer program stored therein which causes a computer to perform processes when executed by the computer, the processes comprising:

selecting a first case from among a plurality of cases, each of which includes a pair of: first data including at least one feature at a time; and a value of an objective variable after a predetermined time from the time, based on subject data including at least one feature at a current time, and acquire a first prediction value that is the value of the objective variable included in the first case, wherein the at least one feature in the first data of each case and the at least one feature in the subject data each includes at least one meteorological variable, and the objective variable indicates a weather state;

estimating frequency data indicating frequencies of observation values of the objective variable, based on a history of observation values of the objective variable, the frequency data being a cumulative distribution function, a probability density distribution, or a histogram;

estimating first frequency data indicating frequencies of first prediction values, based on a history of first prediction values acquired before the first prediction value is acquired, the first frequency data being a cumulative distribution function, a probability density distribution, or a histogram; and correcting the first prediction value acquired by the processor, based on the frequency data and the first frequency data to obtain a predicted value of the weather state after the predetermined time from the current time;

selecting second to k-th cases, and acquire second to k-th prediction values that are values of the objective variable included in the second to k-th cases, respectively;

estimating second to k-th frequency data indicating frequencies of the second to k-th prediction values, based on histories of the second to k-th prediction values; and correcting the second to k-th prediction values acquired by the processor, based on the frequency data and the second to k-th frequency data, respectively.

* * * * *

UNITED STATES PATENT AND TRADEMARK OFFICE
CERTIFICATE OF CORRECTION

PATENT NO. : 11,868,431 B2
APPLICATION NO. : 17/197377
DATED : January 9, 2024
INVENTOR(S) : Mitsuru Kakimoto et al.

It is certified that error appears in the above-identified patent and that said Letters Patent is hereby corrected as shown below:

In the Claims

Claim 2, Column 18, Lines 15-16, "according to-claim 1" should read --according to claim 1--.

Claim 3, Column 18, Lines 19-20, "according to-claim 1" should read --according to claim 1--.

Signed and Sealed this
Twenty-eighth Day of May, 2024

Katherine Kelly Vidal
*Director of the United States Patent and Trademark Office*